United States Patent
Su

(10) Patent No.: US 10,627,979 B2
(45) Date of Patent: Apr. 21, 2020

(54) METHOD, DEVICE, AND STORAGE MEDIUM FOR GENERATING AND SELF-ADAPTIVELY ROTATING VOICE RECOGNITION INTERFACE

(71) Applicant: GUANGZHOU SHENMA MOBILE INFORMATION TECHNOLOGY CO., LTD., Guangzhou (CN)

(72) Inventor: Ying Su, Guangzhou (CN)

(73) Assignee: GUANGZHOU SHENMA MOBILE INFORMATION TECHNOLOGY CO., LTD., Guangzhou (CN)

( * ) Notice: Subject to any disclaimer, the term of this patent is extended or adjusted under 35 U.S.C. 154(b) by 51 days.

(21) Appl. No.: 15/839,182

(22) Filed: Dec. 12, 2017

(65) Prior Publication Data
US 2018/0164953 A1   Jun. 14, 2018

(30) Foreign Application Priority Data
Dec. 12, 2016   (CN) .......................... 2016 1 1138993

(51) Int. Cl.
| | | |
|---|---|---|
| *G06F 3/0481* | (2013.01) | |
| *G06F 3/038* | (2013.01) | |
| *G06F 3/0487* | (2013.01) | |
| *G10L 15/22* | (2006.01) | |
| *G06F 3/16* | (2006.01) | |

(52) U.S. Cl.
CPC ............ *G06F 3/0481* (2013.01); *G06F 3/038* (2013.01); *G06F 3/0487* (2013.01); *G06F 3/167* (2013.01); *G06F 2203/0381* (2013.01); *G10L 2015/227* (2013.01)

(58) Field of Classification Search
CPC ...... G06F 3/0481; G06F 3/038; G06F 3/0487; G06F 3/167; G06F 2203/0381; G10L 2015/227
See application file for complete search history.

(56) References Cited

U.S. PATENT DOCUMENTS

| | | | | |
|---|---|---|---|---|
| 2006/0274087 A1* | 12/2006 | Kim | ...................... | G06F 1/1622 345/649 |
| 2007/0050778 A1* | 3/2007 | Lee | .................... | H04N 5/44591 718/107 |
| 2011/0167364 A1* | 7/2011 | Pentikainen | ............ | G06F 9/451 715/764 |
| 2014/0343950 A1* | 11/2014 | Simpson | ................. | G06F 3/167 704/275 |
| 2017/0123514 A1* | 5/2017 | Wang | .................... | G06F 3/0346 |
| 2017/0139576 A1* | 5/2017 | Jeong | ................... | G06F 3/0346 |
| 2019/0019476 A1* | 1/2019 | Ge | ...................... | G06F 3/04845 |

* cited by examiner

*Primary Examiner* — Sonia L Gay
(74) *Attorney, Agent, or Firm* — Anova Law Group, PLLC

(57) ABSTRACT

Method, device, and storage medium for generating and self-adaptively rotating a voice recognition interface are provided. The method for generating and self-adaptively rotating a voice recognition interface includes: identifying a direction of an interface layout of a current interface when a voice recognition is triggered; generating the voice recognition interface in a same layout direction as the direction of the current interface layout, the voice recognition interface covering a portion of a screen; monitoring in real time whether the interface layout of the current interface rotates; and rotating the generated voice recognition interface self-adaptively along with the current interface layout, in response to a rotation of the interface layout of the current interface.

15 Claims, 2 Drawing Sheets

METHOD, DEVICE, AND STORAGE MEDIUM FOR GENERATING AND SELF-ADAPTIVELY ROTATING VOICE RECOGNITION INTERFACE

CROSS-REFERENCES TO RELATED APPLICATION

This application claims the priority of Chinese Patent Application No. 201611138993.4, filed on Dec. 12, 2016, the content of which is incorporated by reference in its entirety.

FIELD OF THE DISCLOSURE

The present disclosure generally relates to the field of page display and, more particularly, relates to method, device, and storage medium for generating and self-adaptively rotating a voice recognition interface.

BACKGROUND

With the development of intelligent mobile devices and mobile internet technologies, the mobile devices generally adopt a touch screen to input characters (or text). However, the inputting speed of characters by clicking on a touch screen with a small size is way slower than the inputting speed through a physical keyboard. The user's communication efficiency is affected due to this slower inputting speed.

To improve the inputting efficiency of a touch screen, more and more inputting method developers have developed and provided a voice recognition inputting function as one of the alternative methods of inputting characters. Those methods include Xunfei input method, Sougou pinyin input method and etc. In addition, with the development of the voice recognition technology, the accuracy of voice recognition is getting better, and the application of the voice recognition function is more broadly. For example, conventional search method is based on user's manual input of characters, which is time consuming.

SUMMARY

One aspect of the present disclosure provides a method for generating and self-adaptively rotating a voice recognition interface, including: identifying a direction of an interface layout of a current interface when a voice recognition is triggered; generating the voice recognition interface in a same layout direction as the direction of the current interface layout, the voice recognition interface covering a portion of a screen; monitoring in real time whether the interface layout of the current interface rotates; and rotating the generated voice recognition interface self-adaptively along with the current interface layout, in response to a rotation of the interface layout of the current interface.

Another aspect of the present disclosure provides a device for generating and self-adaptively rotating a voice recognition interface, including: a memory, storing program instructions for a method for generating and self-adaptively rotating a voice recognition interface; and one or more processors, coupled to the memory and, when executing the program instructions, configured for: identifying a direction of an interface layout of a current interface when a voice recognition is triggered; generating the voice recognition interface in a same layout direction as the direction of the current interface layout, the voice recognition interface covering a portion of a screen; monitoring in real time whether the interface layout of the current interface rotates; and rotating the generated voice recognition interface self-adaptively along with the current interface layout, in response to a rotation of the interface layout of the current interface.

Another aspect of the present disclosure provides a non-transitory computer-readable storage medium containing computer-executable program instructions for, when executed by a processor, performing a method for generating and self-adaptively rotating a voice recognition interface, the method including: identifying a direction of an interface layout of a current interface when a voice recognition is triggered; generating the voice recognition interface in a same layout direction as the direction of the current interface layout, the voice recognition interface covering a portion of a screen; monitoring in real time whether the interface layout of the current interface rotates; and rotating the generated voice recognition interface self-adaptively along with the current interface layout, in response to a rotation of the interface layout of the current interface.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

The technical solutions of the present disclosure will be clearly and completely described in conjunction with the accompanying drawings and specific embodiments of the present disclosure.

Mobile browsers often provide a voice recognition search function to improve inputting efficiency and to save inputting time. For example, when a user wants to visit a website, website address or website name may be inputted on a browser on a small touch screen with slow inputting speed, e.g., for English or Chinese characters. When voice recognition search function is used, the search inputting efficiency may be greatly improved. When the name of the website is spoken to a voice recognition interface, the website may be directly opened after the voice content is accurately recognized. For example, a contact person can be found from the phone book through voice recognition.

However, the voice recognition interface often pops up in a full-screen mode when the mobile browser provides the voice recognition search. Such interface covers the whole screen, and the screen display rotation function is disabled.

Some browsers even force the change of the display layout to a portrait display layout (or portrait layout) when the mobile browser uses the voice recognition search in a landscape display layout (or landscape layout). The change gives the user an operational blockage that disrupts the original operational logic and visual experience. In addition, when the voice recognition input function provided by the inputting method is used, the rotation of the screen display layout is also prohibited.

Figure 1:
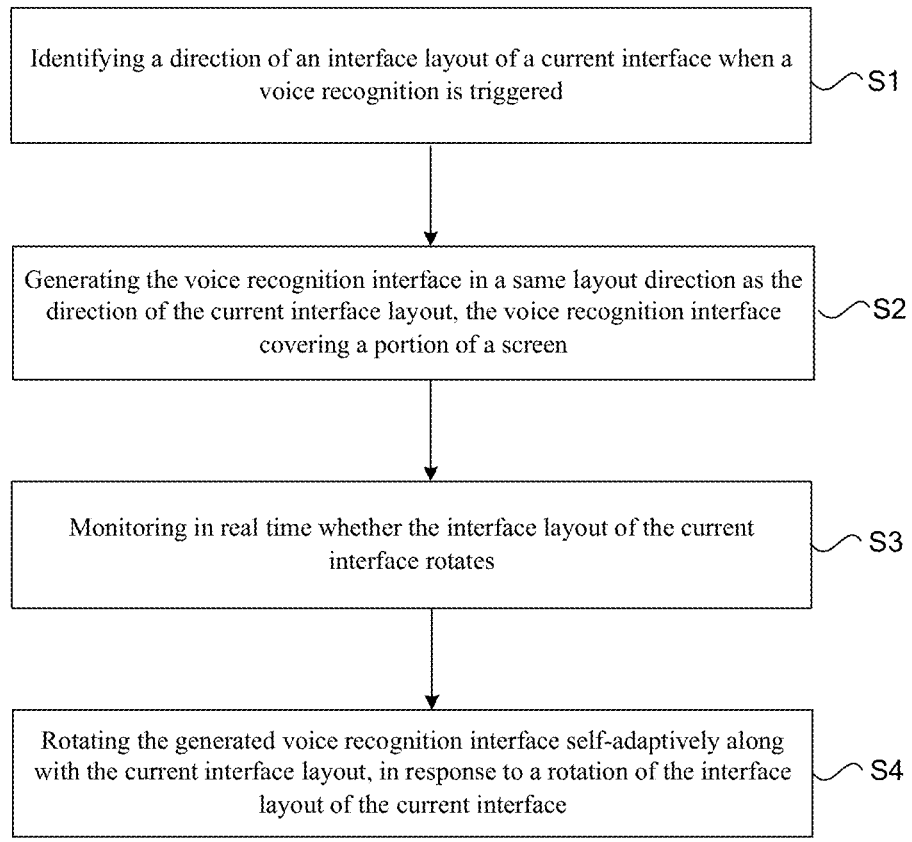
FIG. 1 is a flowchart of an exemplary method for generating and self-adaptively rotating a voice recognition interface according to various disclosed embodiments of the present disclosure.

FIG. 1 is a flow chart of a method for generating a voice recognition interface and self-adaptively rotating the voice recognition interface. As shown in FIG. 1, an exemplary embodiment provides a method for generating a voice recognition interface and self-adaptively rotating the voice recognition interface according to the present disclosure. The method includes following exemplary steps.

S1: Identifying a direction of an interface layout of a current interface when the voice recognition is triggered.

In one embodiment, a screen of an intelligent mobile terminal may have, e.g., a rectangular shape. The display layout may thus include a vertical direction along the screen for displaying the interface layout and a horizontal direction along the screen for displaying the interface layout. The developer will consider different interface layout when designing various application interface displays, and will compile corresponding program codes to the vertical screen display layout and the horizontal screen display layout, respectively. The interface layout also includes a vertical screen display layout and a horizontal screen display layout.

A user may trigger the voice recognition by clicking on a microphone icon displayed on the screen. Most APP developers or manufacturers of the intelligent mobile terminals provide a voice recognition function by displaying a microphone icon on the screen. For example, a microphone icon may be displayed on the right side of the search frame of a mobile browser. The text input APP displays the microphone icon at the middle of the bottom of the input interface. When the user clicks on the microphone icon, the voice recognition function is triggered, and the voice recognition interface is generated.

According to the voice recognition method and device, when the user triggers the voice recognition, the direction of the current interface layout is identified before the voice recognition interface is generated. The direction of current interface layout may be obtained from a system class method. For example, the direction of the current terminal device (vertical or horizontal) through the function [UIDevice currentDevice].orientation is determined. Then the direction of the current interface layout (a vertical direction of the screen display layout or a horizontal direction of the screen display layout) is obtained through the function UIInterfaceOrientation. Landscape represents the horizontal screen display layout, and portrait represents the vertical screen display layout.

The reasons for identifying the direction parameters of the terminal device and the direction parameters of the interface layout may include the following. When the direction of the terminal device is turned, e.g., the user turns the terminal device from the vertical direction to the horizontal direction, the displayed interface, page, or picture won't rotate accordingly if the automatic rotating function in the operating system of the terminal device is disabled. Even if the automatic rotation function is enabled, when an application program is forbidden to be in the horizontal screen display layout, the interface of the application program won't turn accordingly to the horizontal display layout when the user turns the terminal device from the vertical direction to the horizontal direction. Therefore, it is necessary to obtain the direction parameters of the terminal device and the direction parameters of the interface program. When the two parameters point to the vertical direction, the direction of the current interface layout may be confirmed to be the vertical screen display layout. When the two parameters point to the horizontal direction, the direction of the current interface layout may be confirmed to be the horizontal screen display layout.

S2: Generating a voice recognition interface in the same layout direction as the direction of the current interface layout. The voice recognition interface only covers a portion of the screen.

Figure 3A:
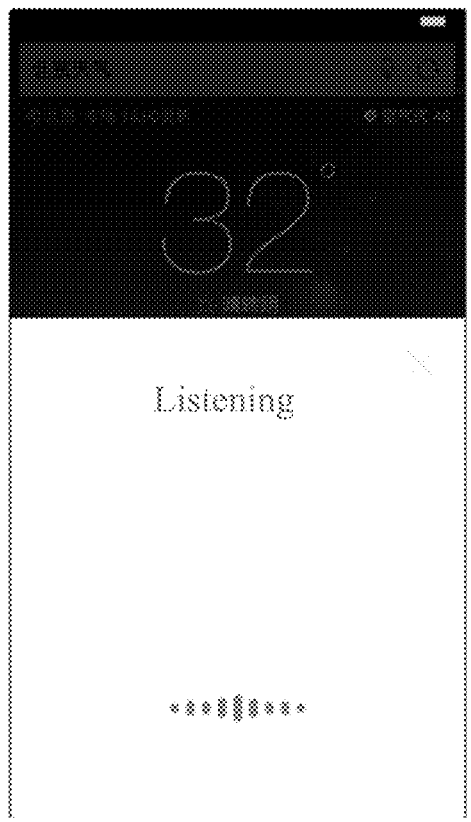
FIG. 3a and FIG. 3b illustrate exemplary screenshots of a voice recognition interface generated by the disclosed methods/devices according to various disclosed embodiments of the present disclosure.
Figure 3B:
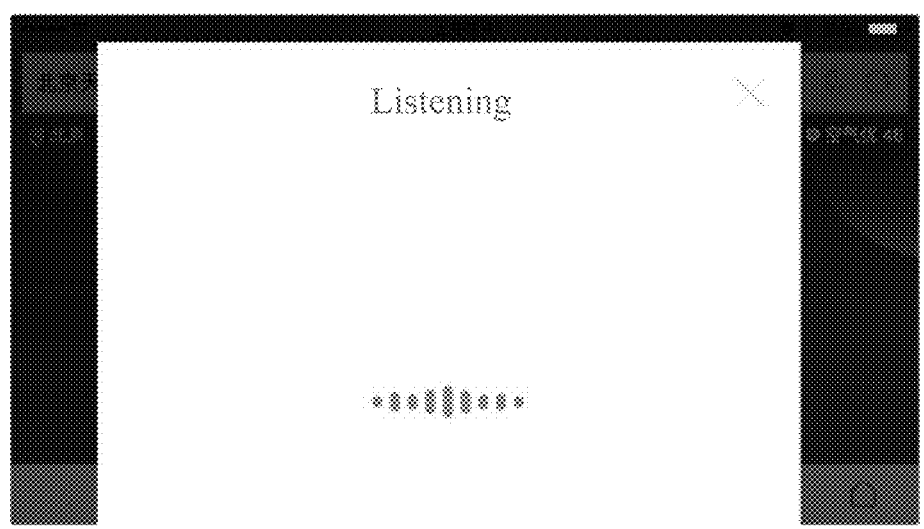

After the direction of the current interface layout is recognized, a corresponding control is called to generate the voice recognition interface. The display direction of the voice recognition interface is the same as the direction of the current interface layout. Only a portion of the screen is covered, so that the user may check the changes of the current display page through the uncovered portion of interface layout. In one specific example, FIG. 3a and FIG. 3b show screenshots of instances of the voice recognition interface, according to the disclosed methods and devices. When it is recognized that the direction of the current interface layout is a landscape layout, the generated voice recognition interface is also a landscape layout and only a portion of the screen is covered. For example, the width of the voice recognition interface is about 77.4% of the width of the screen and the voice recognition interface is centered in the horizontal direction. The height of the voice recognition interface is about 80% of the height of the screen, and the voice recognition interface is aligned along the bottom edge of the screen.

When it is recognized that the direction of the current interface layout is a portrait layout, the generated voice recognition interface is also a portrait layout and only a portion of the screen is covered. For example, the height of the voice recognition interface is about 61.8% of the height of the screen, and the voice recognition interface is aligned along the bottom edge of the screen. The width of the voice recognition interface may be equal to the width of the screen, but it may also be smaller than the width of the screen. The voice recognition interface is centered. The proportion scale values given herein are for purposes of illustration, and it is appreciated by those skilled in the art that other proportional values may be used as well. Any proportional value, which has a visual aesthetic effect on the interface, may be used in accordance with various embodiments of the present disclosure.

In addition, the generated voice recognition interface is a new layer displayed on the screen in a dialog box form. With the new layer established, the voice recognition interface in the form of a dialog box is generated on the new layer. The voice recognition interface is displayed on the screen and covers only a portion of the screen. The other portion of the screen may continuously display the page content of the under layer. For generating the voice recognition interface, the voice recognition interface may be encapsulated into a UIView (i.e., a general view unit), and the voice recognition interface has other elements, e.g., a turn-off button, a volume display area, a voice recognition result area, a prompt language area, etc. When the user triggers the voice recognition, the UIView is added and displayed in the window. In one embodiment, the UIView manages the content for a rectangular area on the screen.

S3: Monitoring in real time whether the interface layout of the current interface rotates or not.

As used herein, the term "rotation" means interface is changed to the horizontal screen display layout from the vertical screen display layout, or changed to the vertical screen display layout from the horizontal screen display layout. The method for monitoring whether the current interface layout changes in real time may be used for identifying the direction of the current interface layout. The direction parameter of the terminal device and the direction parameter of the interface program are obtained, and compared with the previous parameters, respectively. If the two parameters are simultaneously changed from the vertical direction to the horizontal direction, it confirms that the current interface layout changes from the portrait layout to the landscape layout. If the two parameters are simultaneously changed from the horizontal direction to the vertical direction, it confirms that the current interface layout changes from the landscape layout to the portrait layout.

S4: Rotating the generated voice recognition interface self-adaptively along with the current interface layout, in response to a rotation of the interface layout of the current interface.

For example, when the current interface layout is changed from the landscape layout to the portrait layout, the generated voice recognition interface is also changed from the landscape layout to the portrait layout. When the current interface layout is changed from the portrait layout to the landscape layout, the generated voice recognition interface is also changed from the portrait layout to the landscape layout. In addition, when the generated voice recognition interface is self-adapted to rotate along with the current interface, the voice recognition interface will rotate in a self-adaptive mode regardless of whether the recording starts. That is, regardless of whether the user has not pressed the recording button on the voice recognition interface, or the user is pressing the recording button on the voice recognition interface and the recording is underway, the generated voice recognition interface will self-adaptively rotate along with the current interface if the user rotates the terminal device which causes the direction of the current interface layout to rotate. The region and the position of the UIView of the voice recognition interface are updated accordingly. The region and the position of all the elements on the voice recognition interface are also updated. For example, in the volume display area, if the screen has 750 pixels horizontally in the portrait layout, the center of the volume display area is at No. 375th pixel. When rotating to the landscape layout, the screen has 1164 pixels in the horizontal direction. The center of the volume display area is adjusted in the same way to be at No. 582th pixel. Other elements are also changed accordingly.

After the voice recognition process is completed, the voice recognition module may send out the recognized result in a notification mode, and the voice recognition interface will be removed from the current interface or the current screen. The current interface receives the notification of the recognized results, and displays or searches according to the specific application scene of the interface.

The method for generating and self-adaptively rotating the voice recognition interface is provided by various embodiments of the present disclosure. The voice recognition interface is displayed in the form of a dialog box. By monitoring the change of the direction of the terminal device and the current interface layout, the rotation and adaptation of the voice recognition interface is performed accordingly. The voice recognition interface matching with the current interface layout is generated. The current interface won't be forced to be in the portrait layout, and the voice recognition interface may self-adaptively rotate when the user changes between the portrait layout and landscape layout and causes the current display page rotates. In addition, the generated voice recognition interface only covers a portion of the screen of the electronic device, such as a mobile phone. In this way, the changes of the current page may be checked at real time while the user is inputting a voice command. The user does not have to leave the current page and may continue to observe the change of the current page. The feedback speed and the visual sense of the user are greatly improved.

Figure 2:
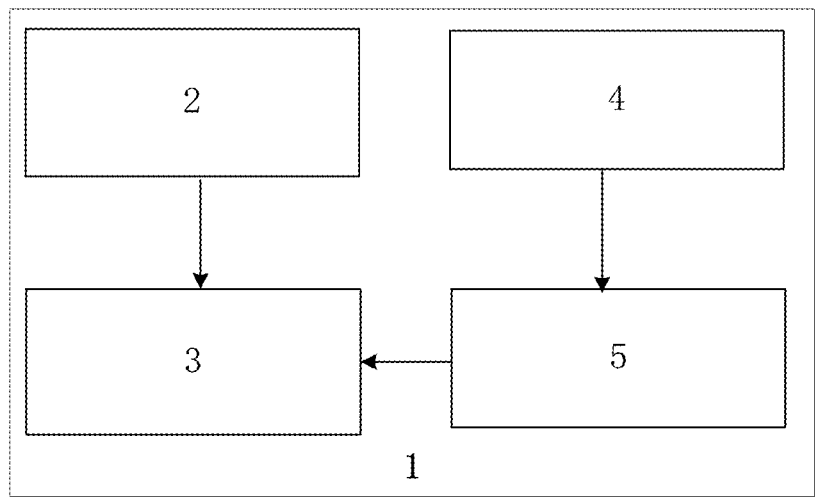
FIG. 2 is a schematic block diagram of an exemplary device for generating and self-adaptively rotating a voice recognition interface according to various disclosed embodiments of the present disclosure.

FIG. 2 is a schematic block diagram of an exemplary device for generating and self-adaptively rotating a voice recognition interface according to some embodiments of the present disclosure. As shown in FIG. 2, the present disclosure provides device 1, which can generate and self-adaptively rotate a voice recognition interface. The device 1 includes an interface layout recognition unit 2, a voice recognition interface generating unit 3, a monitoring unit 4, and a voice recognition interface rotating unit 5.

The interface layout recognition unit 2 is used for recognizing the direction of the current interface layout when the voice recognition is triggered.

The voice recognition interface generating unit 3 is used for generating voice recognition interface. The voice recognition interface is in same direction as the direction of the current interface layout, and the voice recognition interface only covers a portion of the screen.

The monitoring unit 4 is used for monitoring whether the current interface layout rotates or not in real time.

The voice recognition interface rotating unit 5 is used for enabling the generated voice recognition interface to self-adaptively rotate along with the current interface layout when the current interface layout rotates.

In another embodiment, the interface layout direction includes the landscape layout and the portrait layout.

In another embodiment, the generated voice recognition interface is a new layer displayed on the screen in a dialog box form.

In another embodiment, the rotation means the voice recognition interface is changed from a landscape layout to a portrait layout or from a portrait layout to a landscape layout.

In another embodiment, when the current interface layout is a portrait layout, the height of the voice recognition interface is about 61.8% of the height of the screen, and the voice recognition interface is aligned along the bottom edge of the screen. When the current interface layout is a landscape layout, the width of the voice recognition interface is about 77.4% of the width of the screen and the voice recognition interface is centered in horizontal direction. The height of the voice recognition interface is about 80% of the height of the screen, and the voice recognition interface is aligned along the bottom edge of the screen.

In various embodiments, the disclosed device may be used to perform the method for generating a voice recognition interface and self-adaptively rotating the voice recognition interface. The voice recognition interface is displayed in the form of a dialog box. By monitoring the change of the direction of the terminal device and the current interface layout, the rotation and adaptation of the voice recognition interface is performed accordingly. The voice recognition interface matching with the current interface layout is generated. The current interface won't be forced to be in the portrait layout, and the voice recognition interface may self-adaptively rotate when the user changes between the portrait layout and landscape layout and causes the current display page rotates. In addition, the generated voice recognition interface only covers a portion of the screen of the electronic device, such as a mobile phone. In this way, the changes of the current page may be checked at real time while the user is inputting a voice command. The user does not have to leave the current page and may continue to observe the change of the current page. The feedback speed and the visual sense of the user are greatly improved.

Various embodiments of the present disclosure also provide an exemplary device for generating and self-adaptively rotating the voice recognition interface. The device may include a memory for storing program instructions for the disclosed method for generating and self-adaptively rotating a voice recognition interface; and one or more processors, coupled to the memory and. When executing the program instructions, the one or more processors are configured for: identifying a direction of an interface layout of a current interface when a voice recognition is triggered; generating the voice recognition interface in a same layout direction as the direction of the current interface layout, the voice recognition interface covering a portion of a screen; monitoring in real time whether the interface layout of the current interface rotates; and rotating the generated voice recognition interface adaptively along with the current interface layout, in response to a rotation of the interface layout of the current interface.

The voice recognition interface is displayed in the form of a dialog box. By monitoring the change of the direction of the terminal device and the current interface layout, the rotation and adaptation of the voice recognition interface is performed accordingly. The voice recognition interface matching with the current interface layout is generated. The current interface won't be forced to be in the portrait layout, and the voice recognition interface may self-adaptively rotate when the user changes between the portrait layout and landscape layout and causes the current display page rotates. In addition, the generated voice recognition interface only covers a portion of the screen of the electronic device, such as a mobile phone. In this way, the changes of the current page may be checked at real time while the user is inputting a voice command. The user does not have to leave the current page and may continue to observe the change of the current page. The feedback speed and the visual sense of the user are greatly improved.

Various embodiments of the present disclosure also provide a non-transitory computer-readable storage medium containing computer-executable program instructions for, when executed by a processor, performing the disclosed method for generating and self-adaptively rotating a voice recognition interface.

The function is implemented in the form of a software functional unit and it can be sold or used as an independent product, which may be stored in a computer readable storage medium. The technical solution of the present disclosure essentially or partially making contributions to the prior art may be embodied in the form of a software product. The computer software product is stored in a storage medium. The product includes a computer device (a private computer, a server, or internet device) with instructions to execute all or some of the steps of the method disclosed by the embodiment of the disclosure. The storage medium includes a USB flash disk, a removable hard disk, a read-only memory (ROM, read-only memory), a random access memory (RAM, random access memory), a magnetic disk or an optical disk, and the like.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A method for generating and self-adaptively rotating a voice recognition interface, comprising:
    receiving a triggering of a voice recognition on a screen, wherein a first interface is currently displayed on the screen;
    before generating a second interface corresponding to the triggered voice recognition, identifying a layout direction of a first interface layout of the first interface currently displayed on the screen;
    generating the second interface from the first interface to have a second interface layout with a same layout direction as the first interface layout of the first interface;
    monitoring in real time whether the first interface layout of the first interface rotates; and
    in response to a rotation of the first interface layout of the first interface, rotating the second interface self-adaptively along with the first interface layout to have another same layout direction, the rotated second interface covering a portion of the rotated first interface displayed on the screen to allow the rotated first interface to be partially viewable when an operation is performed on the rotated second interface, wherein:
    the second interface is the voice recognition interface; and
    rotating the second interface self-adaptively along with the first interface layout includes:
        rotating the voice recognition interface self-adaptively along with the first interface layout to have another same layout direction, while a recording button on the voice recognition interface is being pressed for recording and the recording is underway.

2. The method according to claim 1, wherein the layout direction comprises:
    a vertical direction along the screen for displaying the first or second interface layout; and
    a horizontal direction along the screen for displaying the first or second interface layout.

3. The method according to claim 1, wherein:
    the second interface is generated as a new layer based on the first interface and is displayed on the screen in form of a dialog box.

4. The method according to claim 1, wherein the rotation of the first or second interface layout comprises:
    a rotation of the first or second interface layout from a landscape layout to a portrait layout with respect to the screen; or
    a rotation of the first or second interface layout from the portrait layout to the landscape layout.

5. The method according to claim 4, wherein:
    when the first interface layout of the first interface is the portrait layout,
    a height of the second interface is about 61.8% of a height of the screen, the second interface being aligned along a bottom edge of the screen, and
    when the first interface layout of the first interface is the landscape layout,
    a width of the second interface is about 77.4% of a width of the screen, the second interface being centered in a horizontal direction, and
    the height of the second interface is about 80% of the height of the screen, the second interface being aligned along the bottom edge of the screen.

6. A device for generating and self-adaptively rotating a voice recognition interface, comprising:
   a memory, storing program instructions for a method for generating and self-adaptively rotating the voice recognition interface; and
   one or more processors, coupled to the memory and, when executing the program instructions, configured for:
   receiving a triggering of a voice recognition on a screen, wherein a first interface is currently displayed on the screen;
   before generating a second interface corresponding to the triggered voice recognition, identifying a layout direction of a first interface layout of the first interface currently displayed on the screen;
   generating the second interface from the first interface to have a second interface layout with a same layout direction as the first interface layout of the first interface;
   monitoring in real time whether the first interface layout of the first interface rotates; and
   in response to a rotation of the first interface layout of the first interface, rotating the second interface self-adaptively along with the first interface layout to have another same layout direction, the rotated second interface covering a portion of the rotated first interface displayed on the screen to allow the rotated first interface to be partially viewable when an operation is performed on the rotated second interface, wherein:
   the second interface is the voice recognition interface; and
   rotating the second interface self-adaptively along with the first interface layout includes:
      rotating the voice recognition interface self-adaptively along with the first interface layout to have another same layout direction, while a recording button on the voice recognition interface is being pressed for recording and the recording is underway.

7. The device according to claim 6, wherein the layout direction comprises:
   a vertical direction along the screen for displaying the first or second interface layout; and
   a horizontal direction along the screen for displaying the first or second interface layout.

8. The device according to claim 6, wherein
   the second interface is generated as a new layer based on the first interface and is displayed on the screen in form of a dialog box.

9. The device according to claim 6, wherein the rotation of the first or second interface layout comprises:
   a rotation of the first or second interface layout from a landscape layout to a portrait layout with respect to the screen; or
   a rotation of the first or second interface layout from the portrait layout to the landscape layout.

10. The device according to claim 9, wherein:
   when the first interface layout of the first interface is the portrait layout,
   a height of the second interface is about 61.8% of a height of the screen the second interface being aligned along a bottom edge of the screen, and
   when the first interface layout of the first interface is the landscape layout,
   a width of the second interface is about 77.4% of a width of the screen, the second interface being centered in a horizontal direction, and
   the height of the second interface is about 80% of the height of the screen, the second interface being aligned along the bottom edge of the screen.

11. A non-transitory computer-readable storage medium containing computer-executable program instructions for, when executed by a processor, performing a method for generating and self-adaptively rotating a voice recognition interface, the method comprising:
   receiving a triggering of a voice recognition on a screen, wherein a first interface is currently displayed on the screen;
   before generating a second interface corresponding to the triggered voice recognition, identifying a layout direction of a first interface layout of the first interface currently displayed on the screen;
   generating the second interface from the first interface to have a second interface layout with a same layout direction as the first interface layout of the first interface;
   monitoring in real time whether the first interface layout of the first interface rotates; and
   in response to a rotation of the first interface layout of the first interface, rotating the second interface self-adaptively along with the first interface layout to have another same layout direction, the rotated second interface covering a portion of the rotated first interface displayed on the screen to allow the rotated first interface to be partially viewable when an operation is performed on the rotated second interface, wherein:
   the second interface is the voice recognition interface; and
   rotating the second interface self-adaptively along with the first interface layout includes:
      rotating the voice recognition interface self-adaptively along with the first interface layout to have another same layout direction, while a recording button on the voice recognition interface is being pressed for recording and the recording is underway.

12. The storage medium according to claim 11, wherein the layout direction comprises:
   a vertical direction along the screen for displaying the first or second interface layout; and
   a horizontal direction along the screen for displaying the first or second interface layout.

13. The storage medium according to claim 11, wherein:
   the second interface is generated as a new layer based on the first interface and is displayed on the screen in form of a dialog box.

14. The storage medium according to claim 11, wherein the rotation of the first or second interface layout comprises:
   a rotation of the first or second interface layout from a landscape layout to a portrait layout with respect to the screen; or
   a rotation of the first or second interface layout from the portrait layout to the landscape layout.

15. The storage medium according to claim 14, wherein:
   when the first interface layout of the first interface is the portrait layout,
   a height of the second interface is about 61.8% of a height of the screen, the second interface being aligned along a bottom edge of the screen, and
   when the first interface layout of the first interface is the landscape layout,
   a width of the second interface is about 77.4% of a width of the screen, the second interface being centered in a horizontal direction, and
   the height of the second interface is about 80% of the height of the screen, the second interface being aligned along the bottom edge of the screen.

* * * * *